US005182794A

United States Patent [19]
Gasperi et al.

[11] Patent Number: 5,182,794
[45] Date of Patent: Jan. 26, 1993

[54] RECURRENT NEURAL NETWORKS TEACHING SYSTEM

[75] Inventors: Michael L. Gasperi, Caledonia; Wesley Davis, Franklin, both of Wis.

[73] Assignee: Allen-Bradley Company, Inc., Milwaukee, Wis.

[21] Appl. No.: 860,225

[22] Filed: Mar. 27, 1992

Related U.S. Application Data

[63] Continuation of Ser. No. 551,983, Jul. 12, 1990, abandoned.

[51] Int. Cl.$^5$ ............................................. G06F 15/18
[52] U.S. Cl. ..................................................... 395/23
[58] Field of Search ..................................... 395/23, 24

[56] References Cited

PUBLICATIONS

Generalization of Back-Propagation to Recurrent Neural Networks; F. J. Pineda; Physical Review Letters; vol. 59, No. 19; pp. 2229–2232; Nov. 9, 1987.
"A Learning Algorithm for Continually Running Fully Recurrent Neural Networks", Ronald J. Willaims, David Zipser, Neural Computation 1,270–280 1989.
"Dynamics and Architecture for Neural Computation", Fernando J. Pineda, Journal of Complexity 4,216–245, 1988.

Primary Examiner—Allen R. MacDonald
Attorney, Agent, or Firm—Quarles & Brady

[57] ABSTRACT

A teaching method for a recurrent neural network having hidden, output and input neurons calculates weighting errors over a limited number of propagations of the network. This process permits the use of conventional teaching sets, such as are used with feedforward networks, to be used with recurrent networks. The teaching outputs are substituted for the computed activations of the output neurons in the forward propagation and error correction stages. Back propagated error from the last propagation is assumed to be zero for the hidden neurons. A method of reducing drift of the network with respect to a modeled process is also described and a forced cycling method to eliminate the time lag between network input and output.

7 Claims, 8 Drawing Sheets

FORWARD PROPAGATION

BACK PROPAGATION

MODIFY WEIGHTS

INCREMENT TIME AND SHIFT ACTIVATIONS

RECURRENT NEURAL NETWORKS TEACHING SYSTEM

This application is a continuation of application Ser. No. 07/551,983 filed Jul. 12, 1990, now abandoned.

BACKGROUND OF THE INVENTION

1. Field of the Invention

This invention relates to neural-network computer architectures and specifically to a teaching method for recurrent neural networks.

2. Background Art

Neural networks are computing devices inspired by biological models and distinguished from other computing devices by an architecture which employs a number of highly interconnected elemental "neurons". Each neuron is comprised of a summing junction for receiving signals from other neurons, weighting each signal by a weighting value and summing them together. The summing junction is ordinarily followed by a compressor or "squashing" function, (typically a logistic curve), that compresses the output from the summing junction into a predetermined range, ordinarily from zero to one. The neuron's inputs are the inputs to the summing junction and the neuron's output, termed an "activation", is the output from the compressor.

The inputs of each neuron may be connected to the outputs of many other neurons and the neuron's activation may be connected, in turn, to the inputs of still other neurons. In a "feedforward" neural net architecture, inputs to the network are received by a first layer of neurons whose activations feed the inputs of a second layer of neurons and so on for as many layers as desired. The final layer provides the output of the network.

In a "recurrent" neural network architecture, inputs are received by a single layer of neurons and the activations of those neurons are fed back as inputs to that single layer to produce new activations during a "propagation".

Both types of neural network architectures may be realized through programs running on conventional von Neuman architecture digital computers. Alternatively, neural networks may be constructed with dedicated analog or digital circuitry, for example, using analog summing junctions and function generators to construct each neuron as is generally understood in the art.

In operation, the neural network receives an input or a set of inputs and produces an output or set of outputs dependant on the inputs and on the weighting values assigned to each neuron's inputs. With the appropriate selection of the weighting values, a variety of computational processes may be performed.

The relationship between the weighting values and the computational process is extremely complex and the weighting values are ordinarily determined by a teaching procedure. With the teaching procedure, a teaching set of corresponding inputs and target outputs are presented to the neural network and error values are generated which are used to modify an initial set of weighting values. This process is repeated until the generated error values are acceptably low at which point the weighting values may be fixed.

Although the teaching method of programming neural networks appears cumbersome when compared with the programming of a conventional von Neuman computer—because many inputs and outputs must be presented in teaching the neural network—the advantage to the teaching method of programming is that the mechanics of the computational process need not be understood. This makes neural network computers ideal for use in modeling applications where inputs and outputs are available but the underlying mathematical process is not known.

One particular modeling application for which neural networks may be useful is that of modeling industrial processes. Specifically, a manufacturing process under automatic control may have a number of inputs and outputs. The inputs control actuators such as valves and the like and the outputs may be from process sensors such as temperature or pressure gauges. During normal operation of the manufacturing process, the inputs and outputs are related to each other in a complex but stable manner dictated by the physics of the process. A neural network may be taught this relationship by using actual input and output values of the manufacturing process for teaching.

After the neural network has been taught, it may be presented with inputs from the manufacturing process and the outputs from the manufacturing process may be compared with the outputs from the neural network. If the outputs from the neural network differ greatly from the outputs of the manufacturing process, a malfunction may have occurred, such as may be caused by a disabled sensor or process failure. The programmed neural network thus may provide a benchmark of proper process operation and trigger an alarm if the manufacturing process deviates from a recognized pattern.

This modeling technique is particularly attractive for many real world industrial processes where the outputs are complex and non-linear functions of the inputs and may not be modeled by more conventional techniques.

For manufacturing processes with intrinsic storage or time delays, the outputs of the process will depend not only on the current inputs but also on the inputs for previous times as dictated by the system "memory" of the process. If a feedforward type neural network architecture is used to model this type of process, the system memory of the process is accommodated by means of a tapped delay line on the input of the neural network. The delay line stores a time series of process inputs for the length of the system memory and presents samples of the process inputs at discrete time intervals to the network as separate inputs. The neural network generates a current output by processing the present inputs and previous sampled values of the those inputs.

The use of a tapped delay line works well for processes with short system memories but is less successful for processes with long system memories. A simple example of a process with an long system memory is one which involves the filling of a storage tank. The level of material in the tank will depend not only on the current inputs to the tank but on the inputs from all previous times.

In contrast to the feedforward neural network architecture, the recurrent network architecture requires no tapped delay line on its input. Rather, the activations of the neurons themselves serve as memory to provide the necessary storage of previous inputs. Accordingly, recurrent neural networks are preferable for modeling many real physical processes. Unfortunately, however, whereas the teaching process for feedforward neural networks is relatively straightforward and well understood, the teaching process presently available for teaching recurrent networks is difficult, requiring exhaustive analysis of all inputs and outputs, and high levels of mathematical precision, the latter requirement necessitating the use of complex and expensive computer equipment.

SUMMARY OF THE INVENTION

The present invention provides an improved teaching method for recurrent neural networks. Key to this teaching method is the calculation of neuron weights by the use of teaching sets applied over a limited number of propagations of the network. This permits the application of teaching methods similar to those used with feedforward networks.

Specifically, the weights and activations of the neurons are initialized and a first teaching input is applied. A new set of activations are computed for a predetermined number of forward propagated "layers" including a second layer. Error values are "back propagated" over these layers and the weights for the neurons are corrected by evaluating the forward propagated activations and the back propagated errors. The next teaching input is then input to the network and the teaching cycle is repeated.

Accordingly it is one object of the invention to adapt the teaching techniques of feedforward neural networks to recurrent neural networks. The teaching is relatively fast in comparison to the previously used teaching method for recurrent networks because it employs a relatively low number of layers.

After each teaching cycle the activations of the first layer of neurons may be replaced with the activations of the second layer of neurons as computed during the teaching cycle. Also, during the back propagation of error for the last layer, the error back propagated to the hidden neurons may be assumed to be zero.

Another object of the invention, therefore, is to provide a teaching method that accommodates truncation of the number of layers used in teaching.

During the forward propagation of the teaching cycle the teaching outputs corresponding to each output neuron of each layer are forward propagated instead of the activations of the output neurons. Also during the back propagation of the teaching cycle the error for the output neurons is evaluated from the corresponding teaching output and the activation of the output neuron rather than the combined error values of the succeeding layer.

It is thus another object of the invention to avoid needless propagation of erroneous values during the early stages of the teaching process and thus to improve the teaching rate. Unlike the neuron output, the teaching output is known to be correct for a given layer by definition.

During normal operation of the recurrent neural network, several propagations are required to calculate a process output corresponding to a current process input. The invention also provides a forced cycling method to eliminate the delay caused by these multiple propagations. Specifically, a current process input value is input to the neural network and one forward propagation is performed. The activations so computed are stored. The remaining forward propagations are then performed in rapid sequence to compute the process output prior to the next output sample. For the next process output, the stored activations are restored to the neurons and the process is repeated with the next process input.

It is thus another object of the invention to permit the real time modeling of a process with a recurrent neural network.

The invention also provides a method of reducing drift between an operating recurrent neural network and a modeled process. During the forward propagation of activations of the output neurons during normal operation of the network, the propagated values are comprised of a combination of the activations of the neurons and the actual output of the process being modeled.

It is yet another object of the invention therefore to prevent the modeled value of the operating recurrent neural network from drifting excessively from the actual modeled process.

Other objects and advantages besides those discussed above shall be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Recurrent Neural Network

Figure 1:
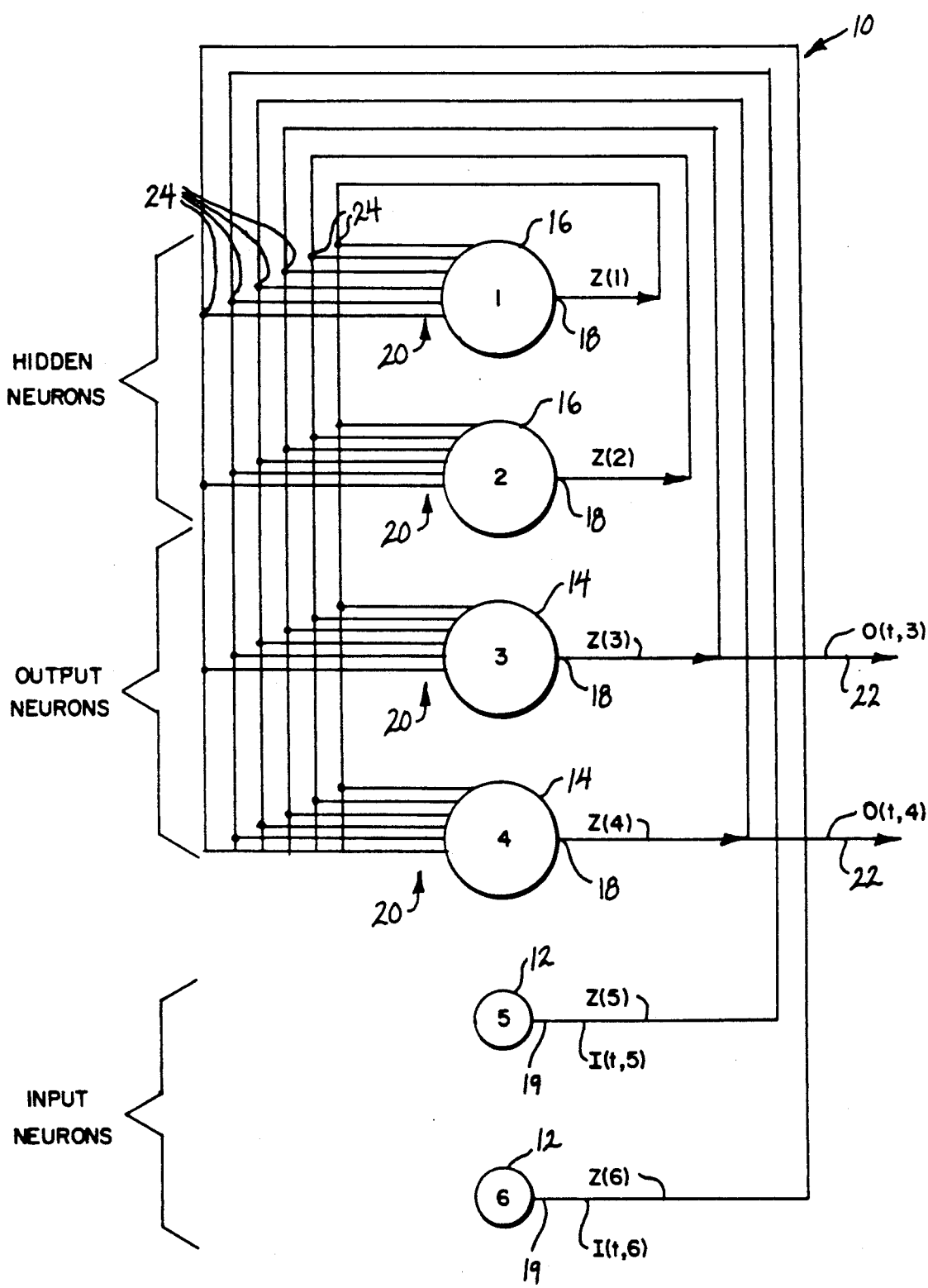
FIG. 1 is a schematic representation of a recurrent neural network having interconnected hidden, output and input neurons which is suitable for use with the present invention.

Referring to FIG. 1, an example recurrent neural net 10 suitable for use with the present method is comprised of input neurons 12, output neurons 14, and hidden neurons 16. For clarity, the example recurrent neural network 10 is comprised of two of each neuron type 12, 14, and 16, however it will be understood from the following discussion that the method of the present invention is applicable generally to recurrent neural networks of arbitrary composition.

The input neurons 12 are simply points at which a network input signal I(t,i) may be introduced to the neural network 10 for processing. The notation of the network input signal I(t,i) indicates that the input signal is a function of time, t, and the particular input neuron i. The input neurons 12 have output activations 19 equal to the network input signal I(t,i), however the input neurons 12 receive no signal from the neural network 10 and perform no processing of the network input signal I(t,i).

The output and hidden neurons 14 and 16 have output activations 18 connected to the inputs of other neurons 24, 14, and 16 and a plurality of inputs 20 from the activations of other neurons 12, 14, and 16. The neuron activations 18 of the output neurons 14 also are accessible outside of the neural network 10 at network output points 22 to provide network output signals O(t,i) from the neural network 10 to indicate the results of the network's computations.

During normal operation of the neural network 10, network input signals I(t,i) are introduced by means of the input neurons 12. For each calculation cycle, these signals I(t,i) plus the previous neuron activations z(i) of the hidden and output neurons 14 and 16 are received by the output and hidden neurons 14 and 16 and processed to produced new neuron activations z(i). These neuron activation signals z(i) of the output and hidden neurons 14 and 16 are propagated, with the next input signal I(t+1,i), to the inputs of the output and hidden neurons 14 and 16 to be again processed to produce new activations. After several such propagations with successive input signals I(t+n,i), the calculation cycle is complete and the activations of the output neurons 14 may be read as the network outputs 22 of the neural network 10 for that calculation cycle.

The next calculation cycle may share propagations with the previous calculation step, starting with the propagation having input I(t+1,i), to produce an output for the next calculation cycle after only one additional propagation. Thus during normal operation the calculation cycles are overlapped to produce outputs O(t,i) after every propagation.

Figure 2:
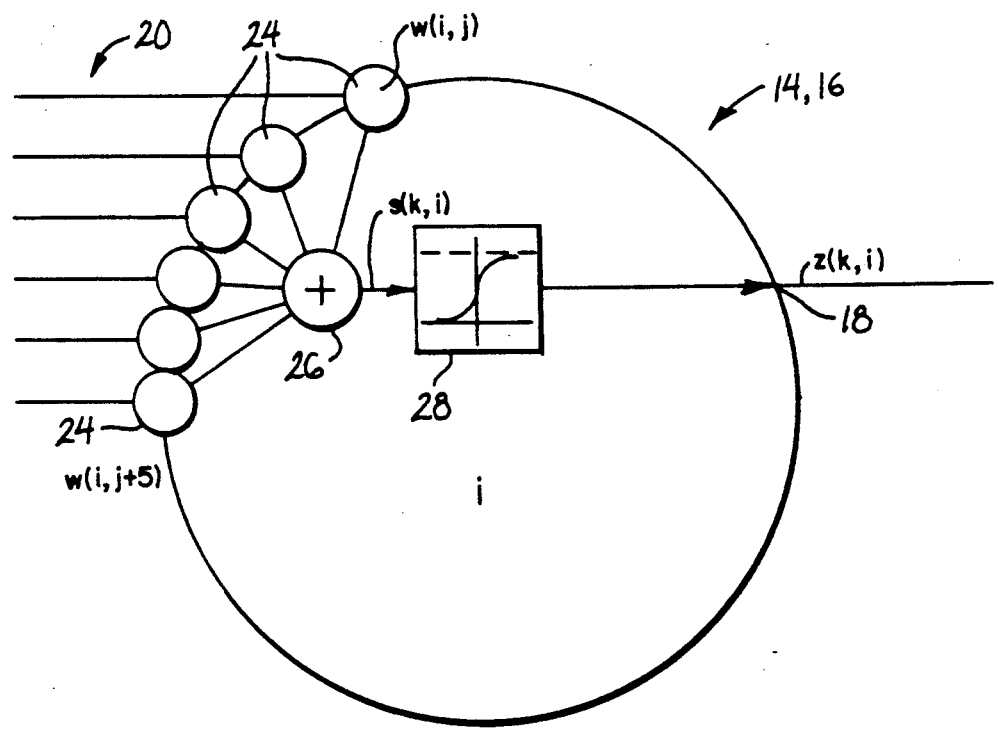
FIG. 2 is a detailed schematic representation of a single hidden or output neuron of the neural network of FIG. 1 showing the normal or forward propagation operation of neuron.

Referring to FIG. 2, the neuron inputs 20 received from the neural network 10 by each neuron 14 and 16 are first weighted at an input node 24 by a weighting value unique to each neuron input 20. Each weight may be identified by the interconnection between neurons 12, 14 or 16 on which it resides, i.e., a weight on the interconnections from neuron j to neuron i is designated w(i,j). The total number of weighting values w(i,j) for the network 10 is the number of hidden and output neurons 14 and 16 times the total number of neurons 12, 14, and 16.

The weighted inputs from these input nodes 24 are then summed together at a summing junction 26 and the resulting sum, s(i), is compressed to a value between 1 and zero by a logistic-based compressor 28 or other compressing function as is known in the art. This compressed sum a(i), becomes the activation z(i from the neuron 14 and 16 during normal operation of the neural network 10.

The activations of a recurrent neural network 10 propagate in a stepwise fashion, the activations at the beginning of the propagation being held constant until the new activations have been calculated upon which time the new activations are substituted for the old activations for the next propagation.

The "program" run by a neural network computer 10 may be thought of as being stored in the value of its weights w(i,j) and activations z(i). When a neural network 10 is used to simulate a physical process, the weights w(i,j) hold the mechanical properties of the process or its "physics", and the activations z(i) hold the present state of the process within its cycle. The determination of the proper weights w(i,j) for the neural network 10 is key to using the neural network 10 for modeling a particular process.

Teaching the Recurrent Neural Network

As mentioned, the previously available method for teaching a recurrent neural network 10 the appropriate weights w(i,j) requires the exhaustive analysis of all possible network inputs I(t,i) and network outputs O(t,i) with a high level of mathematical precision. This in turn necessitates the use of complex and expensive computer equipment for realizing the neural network 10. The present invention provides a teaching method for a recurrent neural network 10 that uses conventional teaching inputs and outputs I(t,i) and O(t,i) forward propagated and back propagated for a limited number of propagations to correct the neuron weighting values. The present method therefore offers a relatively simple teaching method that is compatible with the computer hardware currently in use in the industrial environment.

Figure 3:
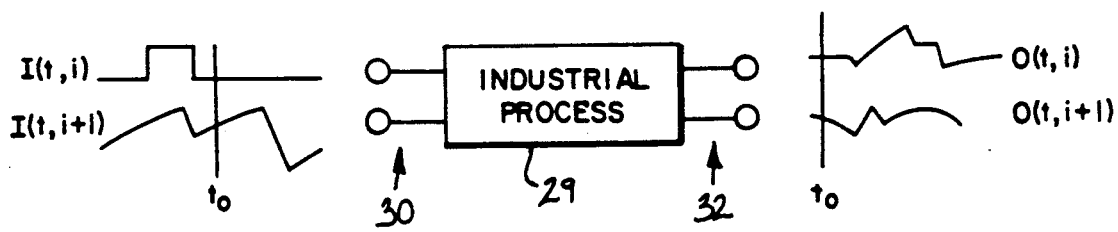
FIG. 3 is block diagram of an industrial process with two inputs and two outputs showing the time relationship of the teaching inputs and outputs for the neural network of FIG. 1.

Referring to FIG. 3, an industrial process 29 may be characterized by its process inputs 30 and process outputs 32, the process inputs 30 representing inputs such as control signals and raw materials, and the process outputs 32 representing outputs such as products and sensor signals.

A teaching set for the neural network 10 is collected from the industrial process 29 comprising a series of input signals 30 and corresponding output signals 32 sampled at a rate sufficient to satisfy the Nyquist sampling theorem and indexed to a common time variable t. The inputs 30 become the teaching inputs designated I(t,i) where t is the time variable and i is an index for distinguishing among several input signals. Similarly, the output signals 32 become the teaching outputs designated O(t,i). The teaching inputs and outputs correspond to the input and output signals to and from the neural network 10 and hence the same notation is used. For the example neural network 10 of FIG. 1, a teaching set with two teaching inputs 30 and two teaching outputs 32 is needed corresponding to the two input neurons 12 and the two output neurons 14.

Figure 4:
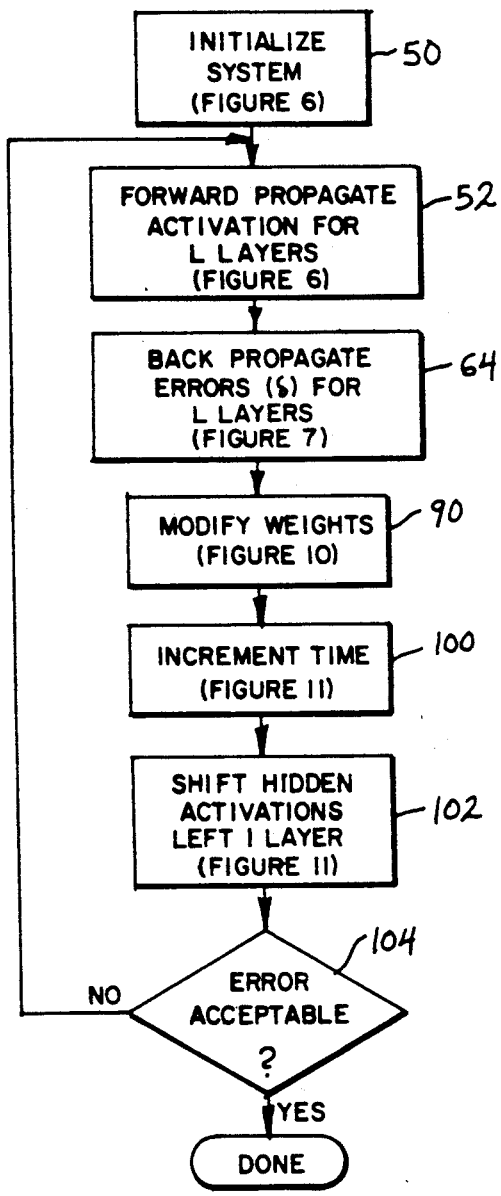
FIG. 4 is a flow chart of the teaching method of the present invention.

Referring now to FIG. 4, the teaching method of the present invention generally involves presenting the teaching inputs I(t,i) to the input neurons 12, and the teaching outputs O(t,i) to the outputs 22 of the neural network 10 during a limited number of propagations comprising a "teaching cycle". During each teaching cycle, the error in the network's response is determined and the weights w(i,j) are adjusted according to the following described method. This process is repeated for many teaching cycles and for the entire teaching set, until the back propagated error is acceptably low.

Figure 5:
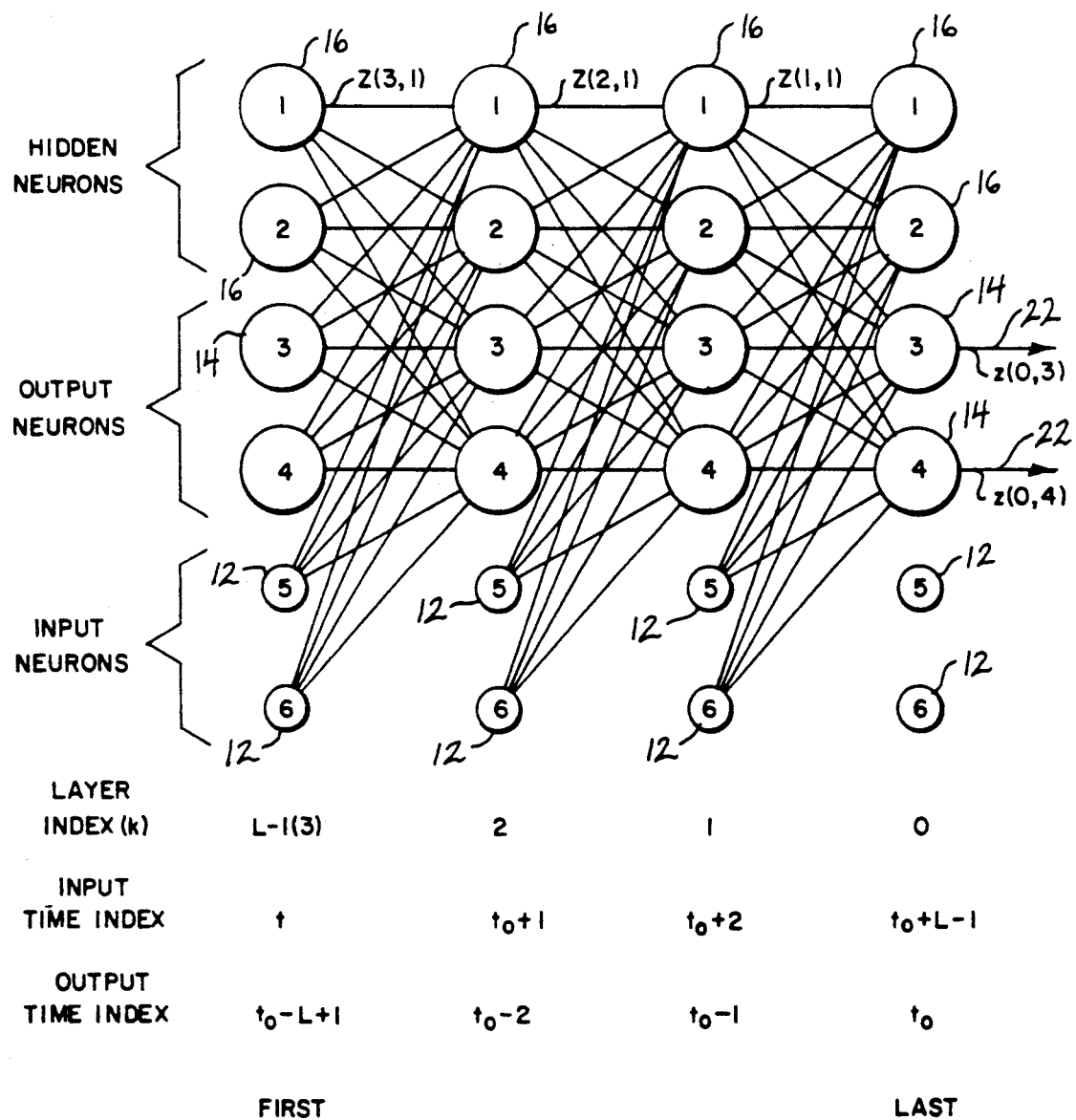
FIG. 5 is a feedforward representation of the recurrent neural network of FIG. 1 where the propagative layers are expanded horizontally.

Referring now to FIG. 5, each neuron 12, 14, and 16 for a given propagation may be thought of as a "layer" in a feedforward neural network, and each subsequent propagation may be thought of as an additional layer of the original neurons 12, 14, and 16 interconnected with the first. A recurrent neural network 10 will have four layers during four propagations. According to this convention, the output of the summing junction 26 and the activation of the neurons 14 or 16 may be identified by the layer number k and the neuron index i as s(k,i) and z(k,i) respectively.

The number of layers k used in the teaching cycle for a recurrent network will be designated L with the last layer being designated 0 and the first layer being designated $L-1$. The number of layers L required for the teaching process depends on the complexity of the process being modeled. Four layers appears to be sufficient for many non-linear processes. More than seven layers is not recommended because the teaching process becomes ineffective.

Necessary for the present teaching method is the preservation of the activations z(k,i) of each neuron 14 and 16 for each of the layers used during the teaching process. In the realization of the neural network 10 on a conventional digital computer, the activations are stored as variables in an array in memory as will be discussed.

Figure 6:
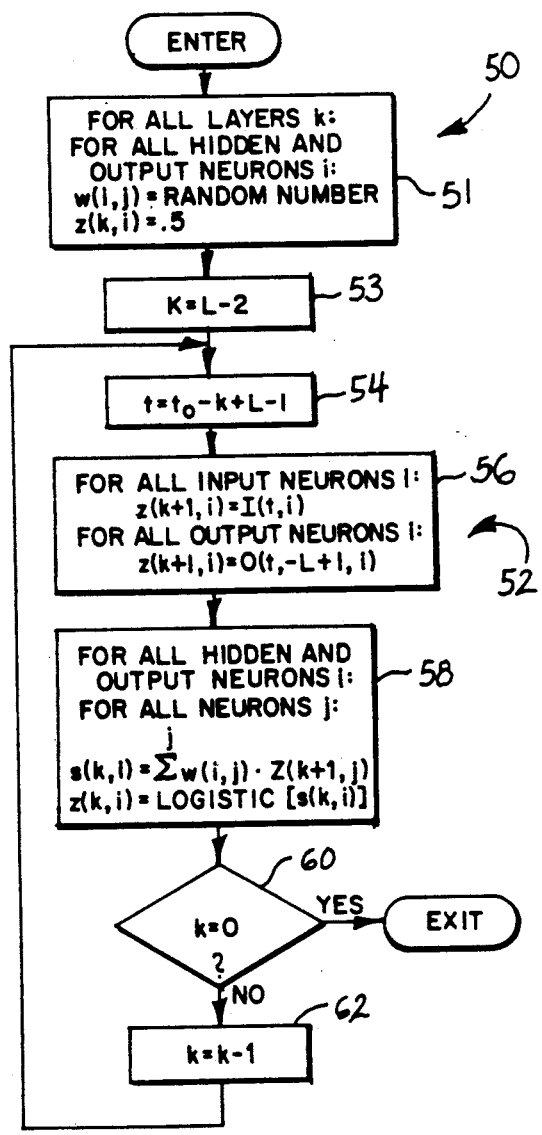
FIG. 6 is a detailed flow chart of the forward propagation step of the method of FIG. 4.

The first step of the teaching process, shown as process block 51 in FIG. 6, is to initialize the weights w(i,j) of each neuron 14 and 16 to some value. Typically there is no way a priori of determining the proper setting of the weights w(i,j) and therefore they are initialized randomly with a number from zero to one. The activations z(k,i) of the neurons 14 and 16 are initialized to 0.5. The reason for this is to ensure that the outputs 18 of each neuron 14 and 16 are non-zero and therefore have some initial representation in the final network outputs 22. The value 0.5 centers the output values in the steepest part of the logistic and speeds the teaching process. As will be apparent to a person of ordinarily skill, from the following discussion, other non-zero initialization values also may be used.

At process block 52, the index k for the layers is set to the layer $L-2$, or for four layers of propagation of FIG. 5, to layer 2. A starting time $t_0$ for indexing the teaching set I(t,i) and O(t,i) is next chosen per process block 54. The time index t for the teaching sets I(t,i) and O(t,i) used with each propagation are a function of the layer k as follows:

$$t = t_0 - k + L - 1 \qquad (1)$$

This formulation simply increases t by one with each decreasing layer k from the first layer.

The activations z(k,i) of the layers of the neural network 10 are then determined. Referring to FIG. 6, and process block 56, the appropriate teaching inputs I(t,i) form the activations 18 of the input neurons 12 on layer $L-1$. And the teaching outputs $O(t-L+1,i)$ become the activations of the output neurons 14 of the first layer $L-1$. The delay of $L-1$ between the teaching inputs I(t,i) and the teaching outputs $O(t-L+1,i)$ is to permit several propagations to occur in each calculation cycle during normal operation of the neural network. This in turn allows better interaction between the hidden neurons and the output neurons.

The activations for the layer $L-2$ may now be computed by forward propagation per process block 58. Each output and hidden neuron 14 and 16 for layer 2 receives the teaching inputs I(t,i) from the input neurons 12 of layer $L-1$, the teaching outputs $O(t-L+1,i)$ from the output neurons 14 of layer $L-1$ and the initialized output values of 0.5 from the hidden neurons 16 of layer $L-1$. Each of these inputs 20 is weighted by the randomly initialized weights w(i,j) and summed by the summing junction 26 to produce the sum s(k,i) as follows:

$$s(k,i) = \sum_{j} w(i,j) * z(k+1,j) \qquad (2)$$

where j is an index variable ranging over all hidden and output neurons (which have summing junctions 26) and k indicates the current layer, in this case $L-2$.

As mentioned above, each weight w(i,j) is identified by the destination and source neurons of the interconnection on which it resided. For example the weight on the interconnection from the second neuron to the third neuron will be designated w(3,2). The weights for all layers are the same and, therefore, a particular layer need not be designated.

The output of the compressor 28 of the neuron 14 or 16 is calculated from the output of the summing junction 26 and is the logistic function of this output where the logistic is:

$$a = \frac{1}{1 + e^{-s}} \qquad (3)$$

hence:

$$z(k,i) = a(k,1) = \frac{1}{1 + e^{-s(k,i)}} \qquad (4)$$

The computed activations z(k,i) for this layer $L-2$ are stored (as will be the activations of the subsequent layers).

The forward propagation of process blocks 54–58 is repeated for each layer. If activations for all the layers have not been determined then the layer counter k is decremented, at process block 62, effectively incrementing the time index t for the teaching set, per process block 54 and the teaching procedure proceeds to process block 56-58 as have been described. When activations for all the layers have been determined, as indicated by testing a layer counter k at decision block 60 of FIG. 6, the program exits to the back propagation routine 64 as shown in FIG. 4.

For each forward propagation, the activations z(k,i) of the hidden neurons 16 of layer $L-2$, the next teaching inputs I(t,i) and the next teaching outputs $O(t+L,i)$ form the activations propagated to the next layer $L-3$.

For the forward propagation of all layers k it should be noted that the teaching outputs $O(t-L+1,i)$ are used in place of the activations for the output neurons 14 of the previous layer k+1 even though actual activations may have been determined for the output neurons 14. The reason for this substitution of the teaching outputs for the actual activations is that the activations will necessarily have errors when compared to the actual outputs represented by the teaching outputs and hence the teaching outputs of the process being modeled $O(t-L+1,i)$, are preferred.

Figure 7:
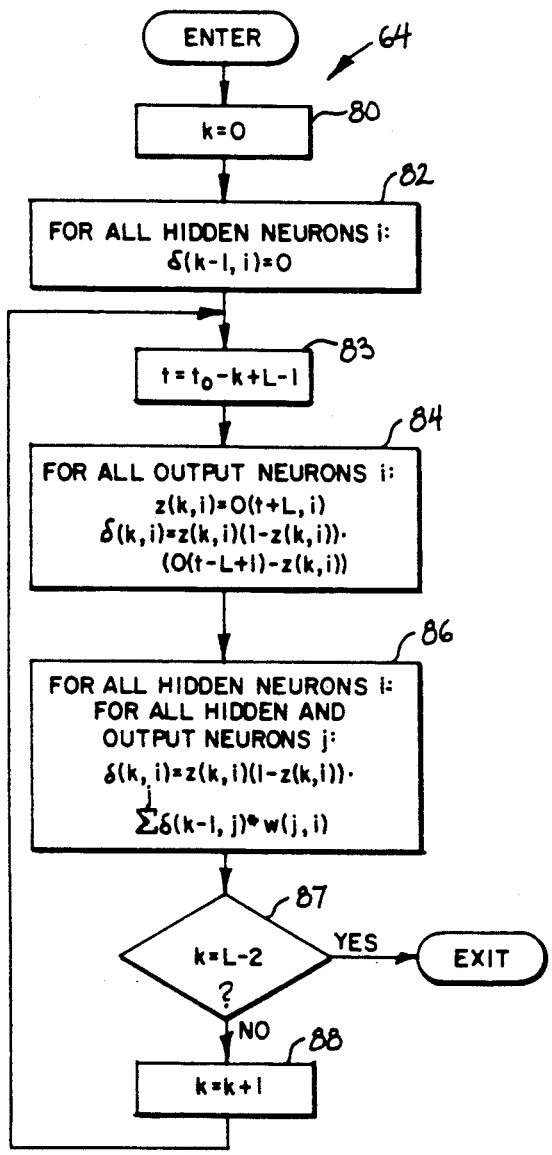
FIG. 7 is a detailed flow chart of the back propagation step of the method of FIG. 4.

Referring to FIGS. 4 and 7, after the activations of all neurons 14 and 16 have been computed for each layer, error values designated $\delta(k,i)$ where k is the layer and i is the neuron are computed for each neuron 14 and 16, per process block 64 of FIG. 4 shown in detail in FIG. 7. For hidden neurons the error calculation process evaluates the difference between the sum of weighted activation values $z(k,i)$ of the neurons from the succeeding layers. For output neurons 14 the error calculation process evaluates the difference between the activation of that neuron and the teaching outputs $O(t-L+1,i)$. Both of these error calculation methods will be termed "back propagation" although the latter method differs from back propagation understood in the context of feedforward networks.

Referring to FIG. 7, the back propagation process begins at the last layer k=0, as shown by process block 80, and proceeds backwards to layer L−1. For the last layer (k=0) where the back propagated error values $\delta(k-1,i)$ do not exist because there is no succeeding layer, the error values $\delta(k,i)$ are set equal to 0 as shown by process block 82. At process block 83, the time index value t is determined as before where:

$$t = t_0 - k + L - 1 \tag{5}$$

Figure 8:
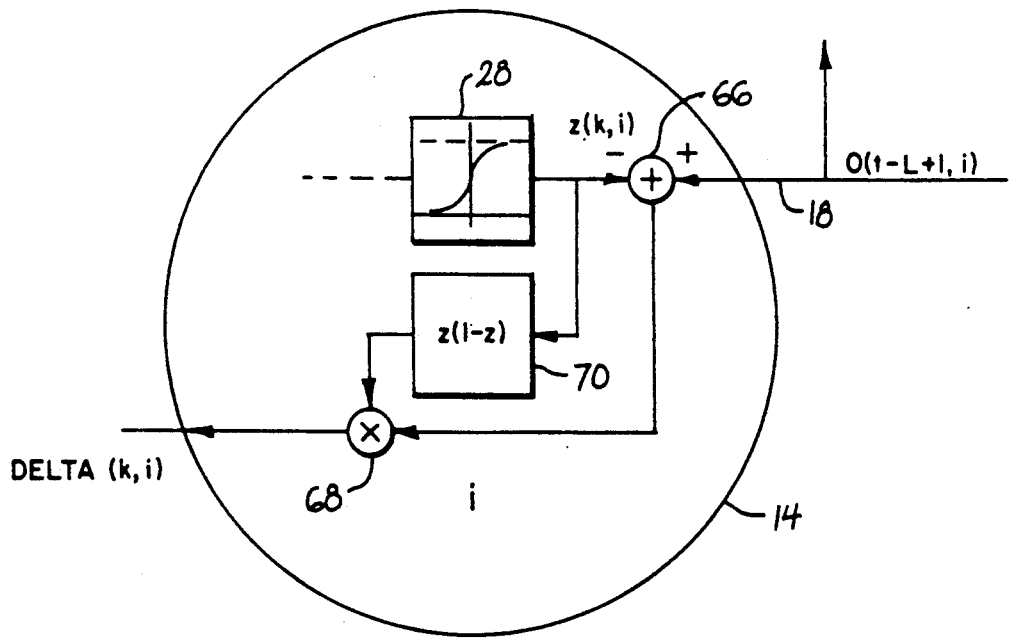
FIG. 8 is a detailed schematic representation of a single output neuron of the neural network of FIG. 1 showing the operation of the neuron during the back propagation step of FIG. 7.

Referring to FIG. 8 and process block 84 of FIG. 7, the error values $\delta(k,i)$ for the output neurons 14 are determined by comparing the teaching outputs $O(t-L+1,i)$ for that layer k to the activations $z(k,i)$ of those neurons 14. The $\delta(k,i)$ for the output neurons 14 is generally computed in process block 84 as follows:

$$\delta(k,i) = z(k,i)(1-z(k,i))[O(t-L+1,i) - z(k,i)] \tag{6}$$

This is shown schematically in FIG. 8 where the activation $z(k,i)$ is subtracted from the teaching output $O(t-L+1,i)$ by summing junction 66 and the result is multiplied by multiplier 68 times $z(k,i)(1-z(k,i))$ which is the derivative of the activation $z(k,i)$ with respect to the sum $s(k,i)$, as is understood in the art and as produced by derivative block 70.

Figure 9:
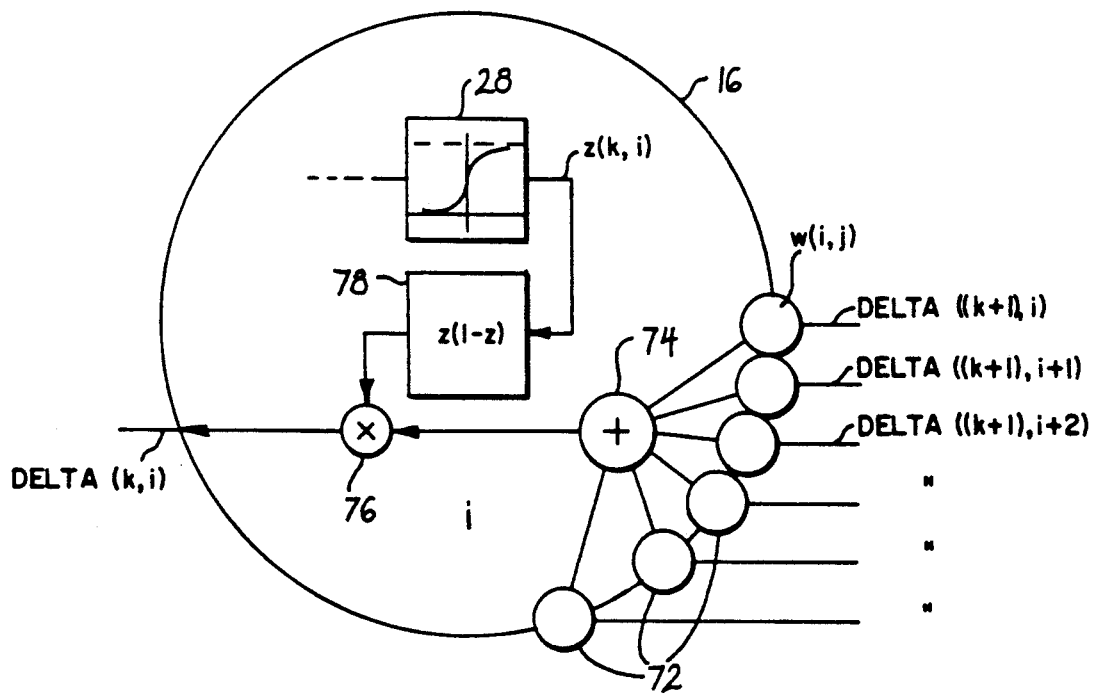
FIG. 9 is a detailed schematic representation of a single hidden neuron of the neural network of FIG. 1 showing the operation of neuron during the back propagation step of FIG. 7.

Referring to FIGS. 7 and 9, for the hidden neurons 16, no teaching output is available and the error values $\delta(k,i)$ are computed instead, as shown in process block 86, from the error values $\delta(k-1,i)$ from the succeeding layer weighted by error receiving nodes 72 using the same weighting values $w(i,j)$ as used by the input nodes 24 of each neuron 16. The weighted error values are summed by summing junction 74. The result is multiplied, by multiplier 76, times the derivative function 78 operating on the previously determined activation $z(k,i)$. The $\delta$ for the hidden neurons may be represented generally as follows:

$$\delta(k,i) = z(k,i)(1-z(k,i)) \sum^{j} \delta(k-1,j)w(j,i) \tag{7}$$

where j is an index variable ranging over all hidden neurons.

These $\delta$ values are used to compute the $\delta$ values for the previous layer and so forth. No $\delta$ values are computed for the input neurons 12.

Figure 10:
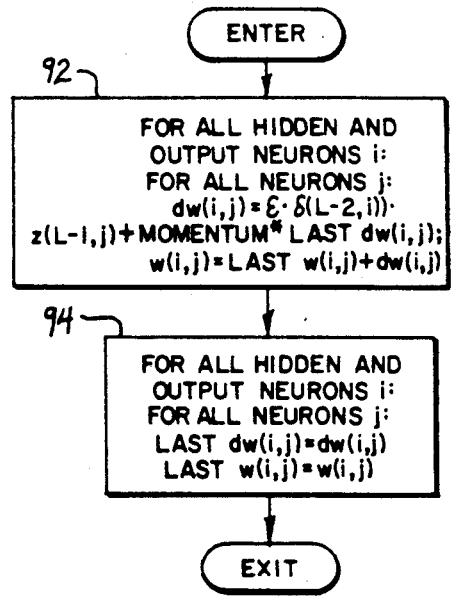
FIG. 10 is a detailed flow chart of the weight modifying step of the method of FIG. 4.

The back propagation process is repeated for each layer k, except the first layer, per the loop formed by decision block 87 and process blocks 83, 84 and 86. When error values $\delta(k,i)$ for all but the first layer have been determined, as indicated by testing a layer counter k at decision block 87, the program exits to the modify weights program 90 as shown in FIG. 4 and FIG. 10. If error values $\delta(k,i)$ for all the layers have not been determined, then the layer counter k is incremented per process block 87, effectively decrementing the time index t for the teaching set per process block 83, and the back propagation procedure loops back through process blocks 84 and 86.

Referring now to FIG. 4 and 10, the necessary modification of the weights $w(i,j)$ is determined from the error value $\delta(k,i)$ of the second layer L−2 and the activation $z(k,i)$ of the first layer L−1. It is possible to examine only these layers because, as noted, the weights $w(i,j)$ are the same for each layer. Specifically, for each weight $w(i,j)$ a weight adjustment factor $dw(i,j)$ is computed per process block 92 as follows:

$$dw(i,j) = \epsilon\delta(L-2,i)z(L-1,j) + (momentum)lastdw(i,j) \tag{8}$$

where lastdw is the value of dw after the previous modification of the weights.

The new weight is determined by adjusting the previous weight value by the corresponding value of dw or $$w(i,j) = lastw(i,j) + dw(i,j) \tag{9}$$

where lastw(i,j) is the weight value w(i,j) after the previous modification of the weights.

$\epsilon$ in equation 8 is a learning rate and along with momentum, another factor, adjusts how fast the weights are modified. $\epsilon$ and momentum are less than one and in one embodiment may be 0.1 and 0.95 respectively.

As shown in process block 94 the values lastdw and lastw are then updated. As stated above, the weights are initially randomized in the initialization step 50 as shown in FIG. 4. The lastw values are also initialized to this random value. At this time the lastdw values are initialized to 0.

Figure 11:
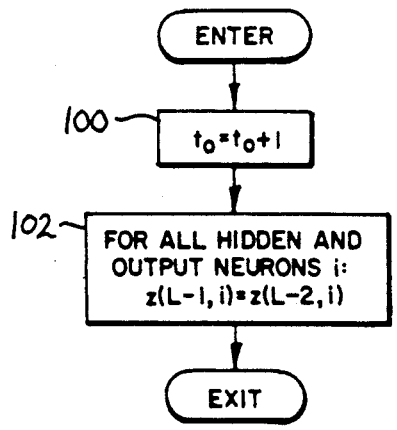
FIG. 11 is a detailed flow chart of the increment time and shift activations methods of FIG. 4.

Once the weights w(i,j) have been adjusted per process block 90 of FIG. 4, the value $t_0$ for referencing the teaching inputs I(t,i) and teaching outputs O(t,i) is incremented by one sample time interval per process block 100, shown in FIG. 11, and the teaching process of FIG. 4 is repeated but with the activations of the hidden neurons of layer L−1 set equal to the previously determined activations of L−2, i.e. a(L−1,i)=a(L−2,i) per process block 102.

As shown in FIG. 4, the teaching process is continued repeating process blocks 52, 64, 90, 100, and 102 until all the teaching inputs and outputs have been exhausted and/or the error is acceptably low as indicated by the $\delta$ values at output neurons. At this time the teaching procedure is terminated.

Referring again to FIG. 3, for the purposes of modeling an industrial process 29, the teaching inputs and outputs may be taken real time from the ongoing process 29, with the outputs delayed by L−1 samples for reasons that have been explained, by means of a delay line. Once the teaching process is complete, the neural network 10 may be run in normal operating mode to receive inputs I(t,i) directly from the industrial process 28 and to calculate outputs O(t,i).

The outputs 22 from the neural network 10 are delayed by the L−1 propagation times of the L layers and so it may be necessary to delay the outputs O(t,i) from the industrial process 28 to be compared to the outputs O(t,i) from the neural network 10.

Any deviation in the compared outputs may be used to trigger an alarm. Such deviations may result from failures of sensors or the like, as has been discussed, and the modeling of the industrial process 29 by the neural network 10 may be used to pinpoint the particular failure.

The teaching process described above determines the weights w(i,j) for the neural network 10 for the particular process 29. These weights are generally constant in time. The initial activations z(i) of the neural network 10, however, will vary depending on the current state of the process 28. If the teaching of the neural network may be done with actual inputs and outputs from the process in real time the activations z(i) at the end of the teaching process will match the state of the industrial process 29. Thus the transition from teaching to monitoring will be practically seamless.

With any practical amount of learning and with realizable computational accuracy, however, the neural network model of a process 29 will not be perfect and hence the output of the neural network will drift with respect to the actual output of the process 29. This drift may be limited to an acceptable amount by means of "shepherding" of the recurrent neural network 10. In the shepherding process, which is used during the normal operation of the neural network 10, only a fraction of the activations of the output neurons 14 is fed back to the inputs of the neurons during each propagation. The output of the process corresponding to the activation of the output neurons 14 is used to make up the difference. Specifically for each output neuron activation z(i), the fed back output z'(i) during a propagation under shepherding is:

$$z'(i) = (1-\beta) \cdot z(i) + \beta \cdot O(t,i) \quad (10)$$

where $\beta$ is a shepherding factor between one and zero and O(t,i) is the actual output of the process 29 corresponding to the modeled output from the network z(i). Generally higher values of $\beta$ ensure closer tracking of the network to the process 29 at the expense of reducing the ability of the network 10 to show process failures. Shepherding may also be used to correct the activations of a network 10 that has been previously taught the correct weights w(i,j) when that network 10 is first used with actual inputs from an industrial process 29 for modeling.

The intrinsic lag of L−1 between the inputs to the neural network 10 and the outputs from that network may be eliminated through "forced cycling" where the propagation of the network 10 during each calculation cycle are performed rapidly between the sampling times of the input and output of the process 29. Thus the output from the neural network may be obtained contemporaneously with the output from the process 29. The rapid cycling of the propagations means that the input values I(t,i) normally used for each propagation of the calculation cycle are not available yet. Accordingly, the input values I(t,i) are simply frozen for each propagation of the calculation cycle when forced cycling is used. This reduces the accuracy of the neural network modeling and the subsequently propagated activations.

For this reason, the activations after the first propagation of the calculation cycle are saved and restored to the first layer (L−1) for the next calculation cycle and the subsequent propagations are recalculated with the latest input values I(t,i) for each calculation cycle.

The operation of the recurrent neural network 10 is well adapted for realization on a conventional von Neuman digital computer. With such an implementation, the activations z(k,i) and thus the inputs 20 for the next iteration are held as stored values in computer memory and the weighting, summation and compression operations are simply mathematical subroutines performed by well understood computer hardware. In the preferred embodiment, the neural network and the teaching method to be described below are run on an IBM AT personal computer using the MSDOS operating system and running a program written in the Microsoft "C" computer language.

Figure 12:
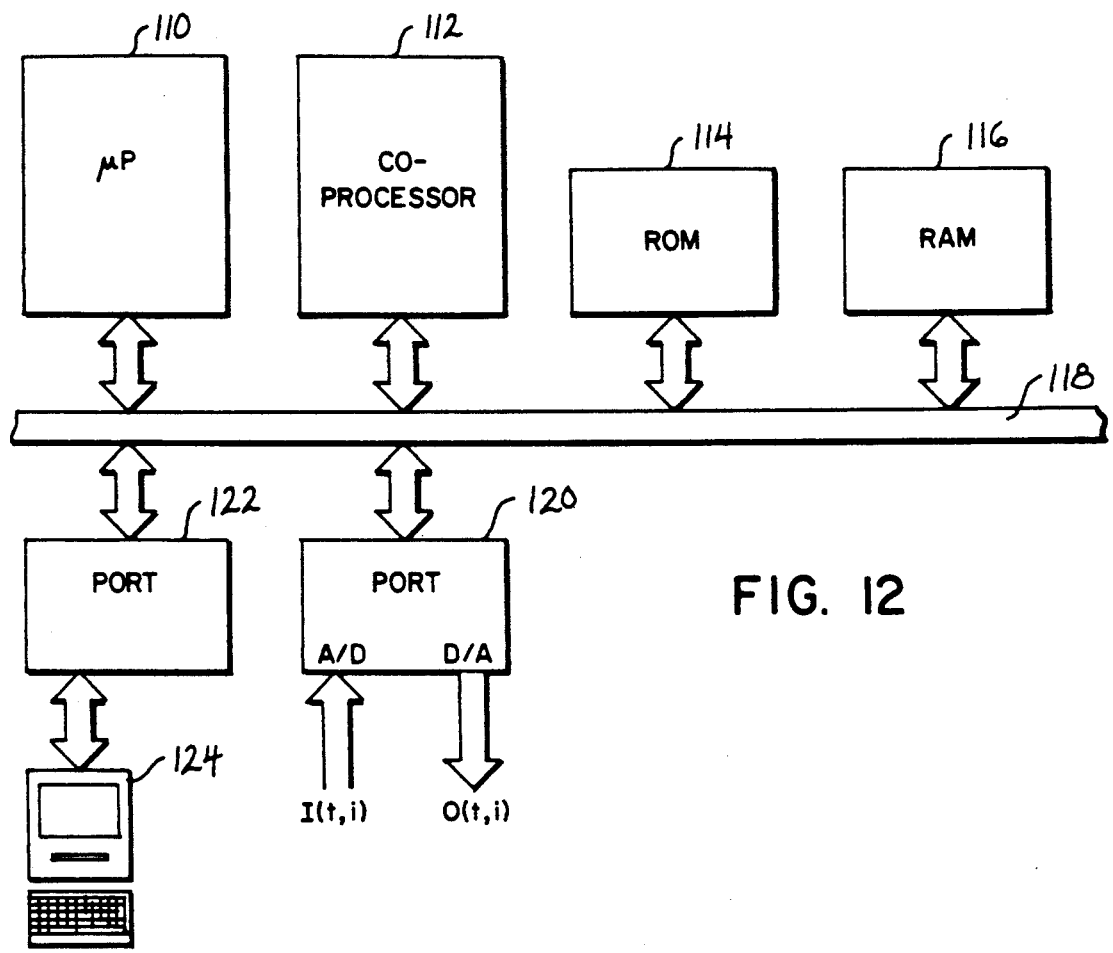
FIG. 12 is a schematic representation of a von Neuman architecture computer suitable for practice of the present invention.

Referring to FIG. 12, a schematic representation of a von Neuman architecture computer, well known in the art, is shown which is comprised of a microprocessor 110 connected through a high speed bus 118 to a coprocessor 112 used to provide rapid arithmetic calculations for the neuron computations described above. Also connected to the bus 118 are a read only memory (ROM) 114 holding an operating system for the computer and a random access memory (RAM) 116 holding the neural network implementation program described above as well as variables representing the states of the various inputs and outputs to the neurons. A port 122 attached to the bus 118 and communicating with the microprocessor 110 permits the input and output of data to and from a terminal 124 which is also used in programming the computer.

Figure 13:
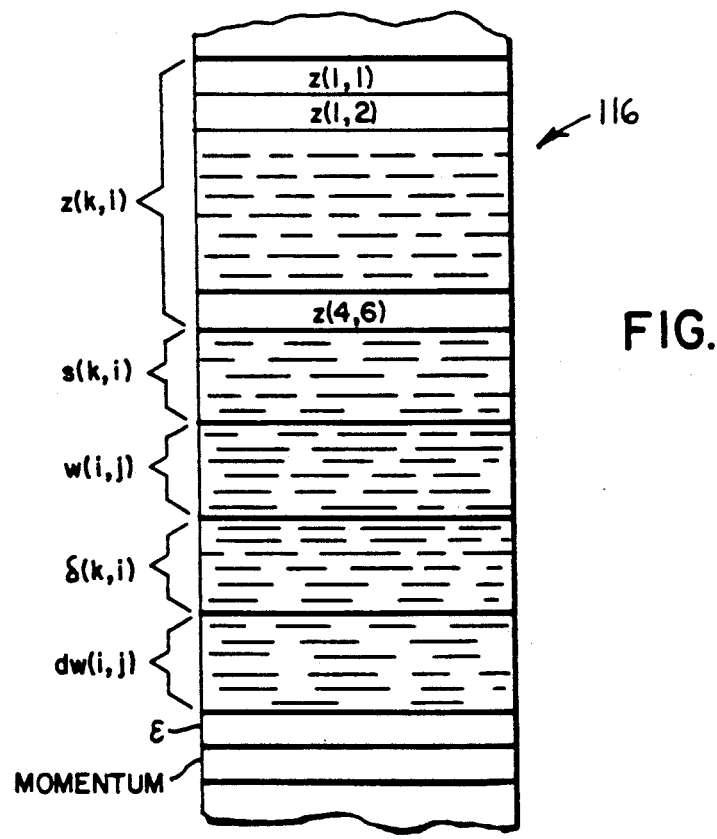
FIG. 13 is a schematic representation of the memory of the computer of FIG. 11 showing the storage of neuron states as memory values.

A second port 120 communicates with the microprocessor 10 via the bus 118 and includes an analog-to-digital converter and a digital-to-analog converter for interfacing the network inputs I(t,i) and outputs O(t,i). Referring to FIG. 13, the RAM 116 holds the values of the neurons activations z(k,i) as described above in the form of a matrix variable in RAM 116 as is understood in the art. Similarly, the sums s(k,i), the weights w(i,j), the error values $\delta$(k,i), the values dw(k,i) and the values $\epsilon$ and momentum are stored in RAM 116.

EXAMPLE 1

Figure 14:
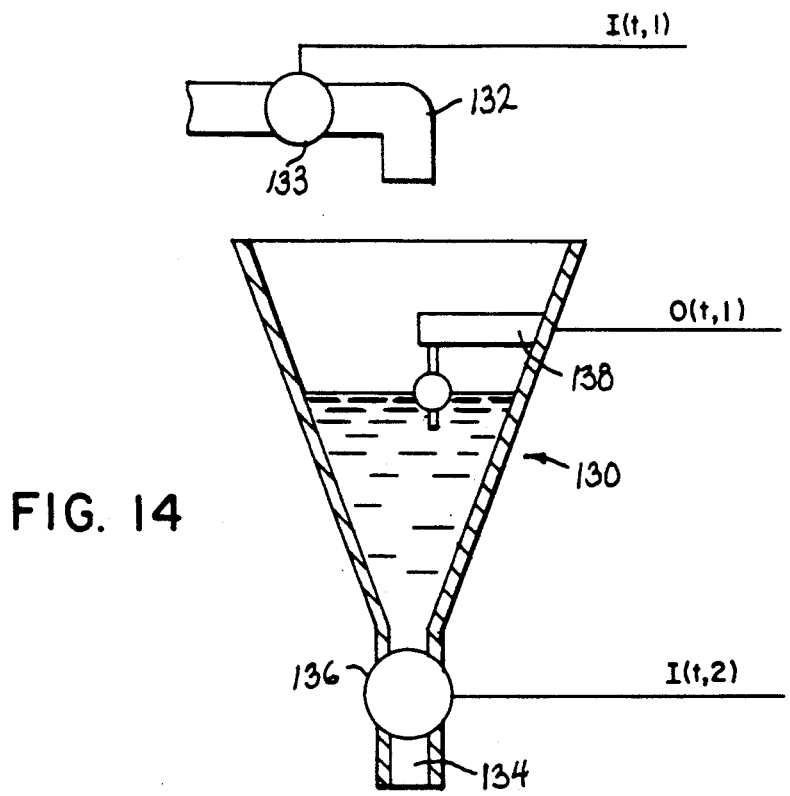
FIG. 14 is a schematic representation of a storage tank modeled by a recurrent neural network taught by the method of the present invention.

Referring to FIG. 14, a storage tank 130 having conical cross section, an inlet 132 controlled by a valve 133, an outlet 134 controlled by a valve 136, and a float 138 indicating fill level, was simulated on a computer. The conical cross section of the tank 130 provides a filling process that is non-linear and that has infinite system memory. The inputs to the process are the signals to input valve 133 and output valve 136, either of which may be on or off for an arbitrary length of time. The output from the process is the signal from the float 138. The rate of flow through the valves 133 and 134 is assumed to be constant regardless of the fill level of the tank 130.

The neural network used to model this system was comprised of three input neurons 12 (one for bias and one for each valve 133 and 136) one output neuron 14 to calculate the fill level of the tank 130 and seven hidden neurons 16. The learning rate, $\epsilon$, was set to 0.1, the momentum was set to 0.95, the number of repetitions of a teaching set (differing from the sequence shown but consistent with operation of the tank) was $10^6$ and the shepherding value β was 0.5. The input neuron 12 to the network used for bias was input with a constant value as is known in the art.

Figure 15:
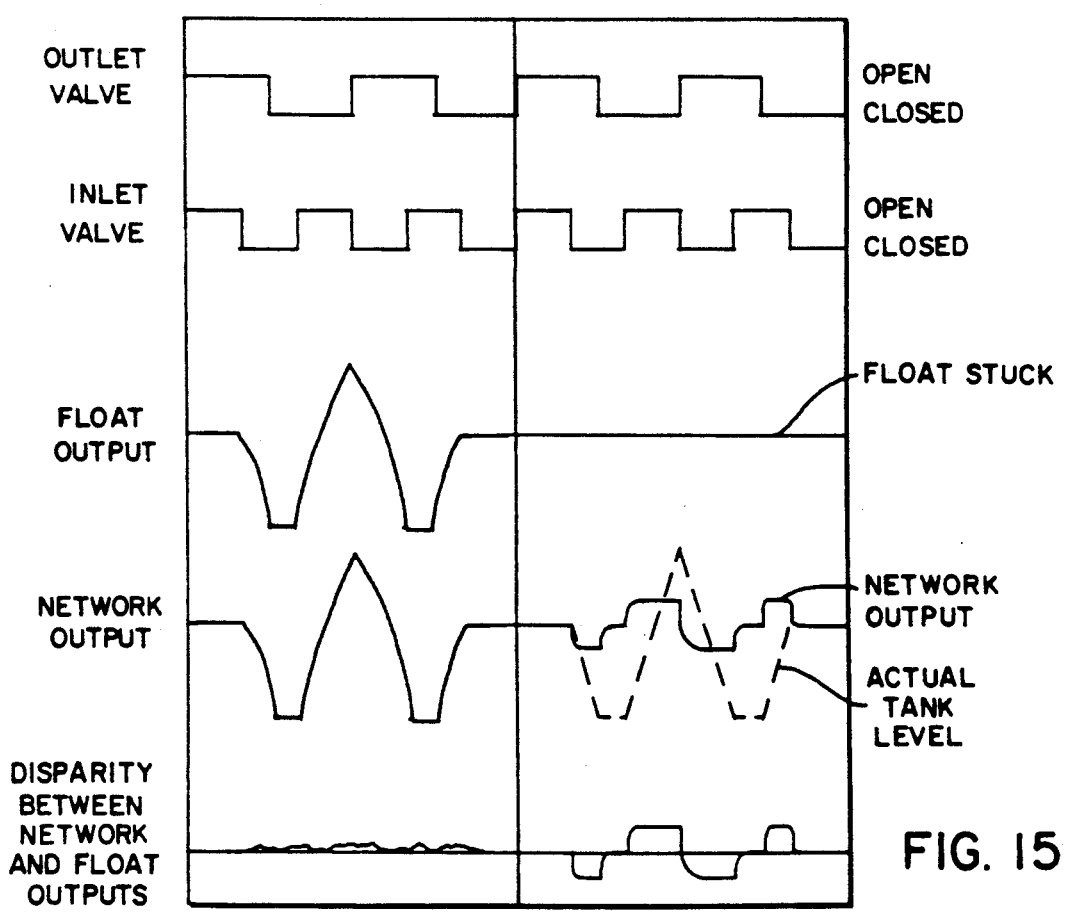
FIG. 15 is a chart showing the outputs of the recurrent neural network used in the modeling of the tank of FIG. 14.

The chart shown in FIG. 15 shows, on its left half, the control signals to the valves 133 and 136, and hence the inputs to the network. Beneath the control signals is shown the float output for a normal operation of the tank 130 and the network output derived from the valve inputs after teaching of the network. The difference between the actual float output and the network output is also shown.

In the right half of the chart, the same sequence of valve openings is shown but the float output is held constant to simulate sticking of the float. The network output is affected by this constant float output as a result of the high level of shepherding, but still shows increased disparity with the process output which may be used to trigger an alarm.

The above description has been that of a preferred embodiment of the present invention. It will occur to those who practice the art that many modifications may be made without departing from the spirit and scope of the invention. For example, the above described teaching method is applicable for recurrent neural networks for other applications that those of the process alarm application described and may be used in general pattern recognition or other such applications of neural networks as are known in the art. In order to apprise the public of the various embodiments that may fall within the scope of the invention, the following claims are made.

I claim:

1. A training apparatus for determining proper weights for recurrent output and recurrent hidden neurons in a recurrent neural network as derived from a teaching set of sequential teaching inputs and teaching outputs, the training apparatus comprising:
   a predetermined number of layers including a first layer and a last layer,
      each layer having layer inputs and layer outputs and layer error inputs and layer error outputs,
      the layer outputs of a given layer connected to the layer inputs of any immediately succeeding layer,
      the layer error outputs of any given layer connected to the layer error inputs of any immediately preceding layer,
      each of the layers including:
         a plurality of input neurons receiving teaching inputs and producing neuron outputs equal to those teaching inputs,
         a number of output neurons and hidden neurons, equal in number to the number of recurrent output neurons and recurrent hidden neurons in the recurrent neural network and having neuron inputs and neuron outputs and neuron error inputs and neuron error outputs,
         each output and hidden neuron having an associated set of weights independent of the other weights of that layer but identical to the weights of a corresponding neuron of the preceding and succeeding layer,
      wherein the output and hidden neurons generate neuron outputs as a function of neuron inputs multiplied by the weights,
      wherein the hidden neurons generate error outputs as a function of neuron error inputs multiplied by the weights and of the neuron output for that neuron,
      wherein the neuron inputs of the hidden and output neurons are connected to the layer inputs and the neuron outputs of the hidden and input neurons are connected to the layer outputs,
      wherein the neuron error inputs of the hidden neurons are connected to the layer error inputs and the neuron error outputs of the hidden and output neurons are connected to the layer error outputs;
   a weight corrector means for receiving final neuron error outputs from the layer preceding the first layer and changing the weights of the hidden and output neurons to produce corrected weights; and
   a communication means for transferring the corrected weights of the output and hidden neurons to corresponding recurrent output and recurrent hidden neurons in the recurrent neural network.

2. The teaching apparatus as recited in claim 1 including an iteration means for sequentially presenting different of the teaching inputs and outputs to the teaching apparatus in a plurality of cycles, and wherein the weight correcting means corrects the weights during each cycle, producing the corrected weights after completion of the plurality of cycles, and
   wherein the layer inputs for the first layer for each cycle are the layer outputs for the layer immediately succeeding the first layer from the previous cycle.

3. The teaching apparatus as recited in claim 1 wherein the weight correcting means corrects the weights by evaluating the difference between the neuron error outputs from the layer preceding the first layer and corresponding neuron outputs of the first layer.

4. The teaching apparatus as recited in claim 1 wherein the predetermined number of layers is greater than 2 and less than 8.

5. The teaching apparatus as recited in claim 1 wherein the neuron outputs for the output neurons are not connected to the layer outputs and wherein corresponding teaching outputs are connected to the layer outputs.

6. The teaching apparatus as recited in claim 1 wherein the neuron error inputs for the hidden neurons of the last layer are zero.

7. The teaching apparatus as recited in claim 1 wherein the output neurons generate error output as a function of the neuron output for that output neuron and a teaching output.

* * * * *